July 1, 1924.

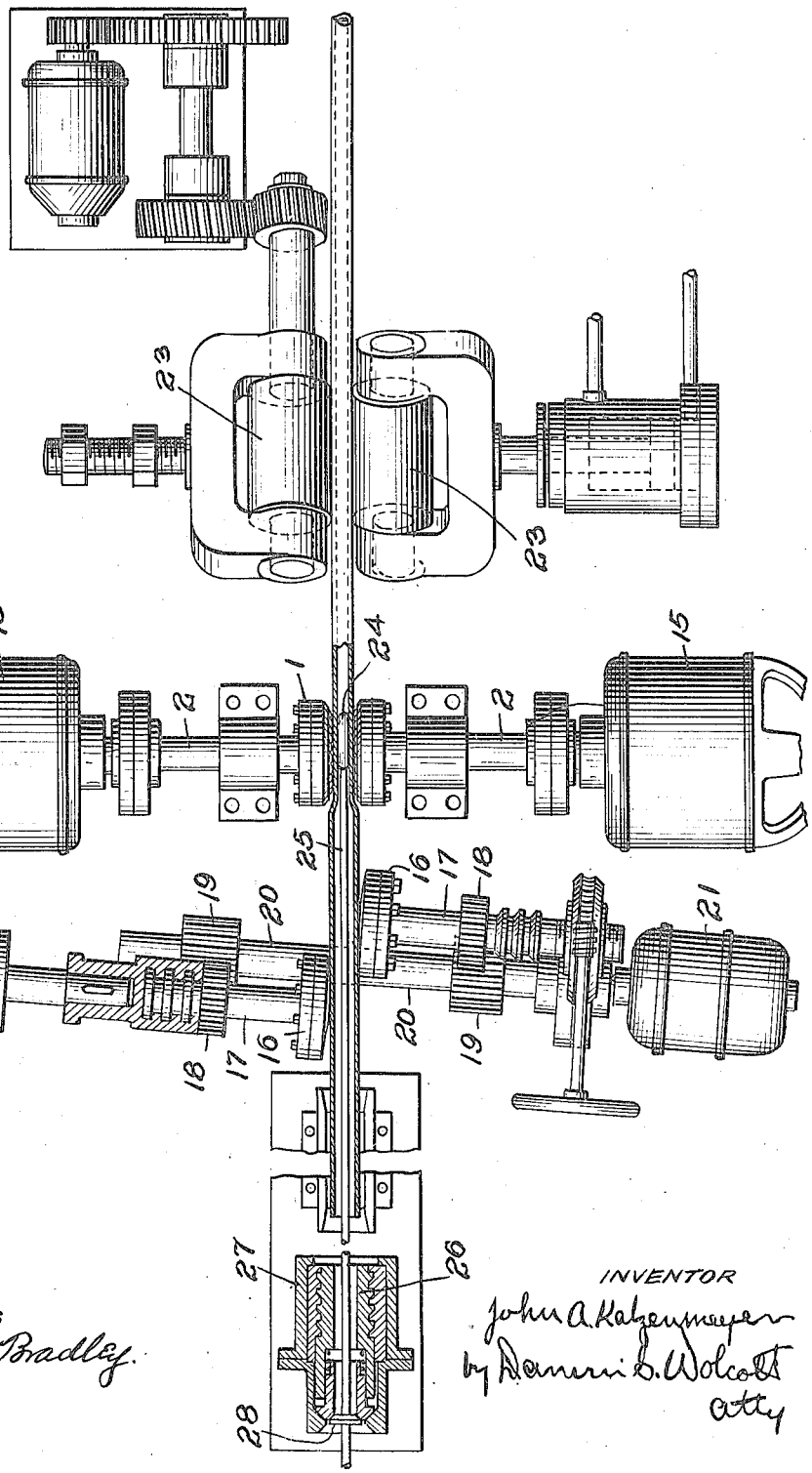

J. A. KATZENMEYER 1,499,533

REDUCING CYLINDRICAL BODIES

Filed June 5, 1922 5 Sheets-Sheet 2

WITNESSES
J. Kirkh Bradley

INVENTOR
John A. Katzenmeyer
by Dennis S. Wolcott
atty

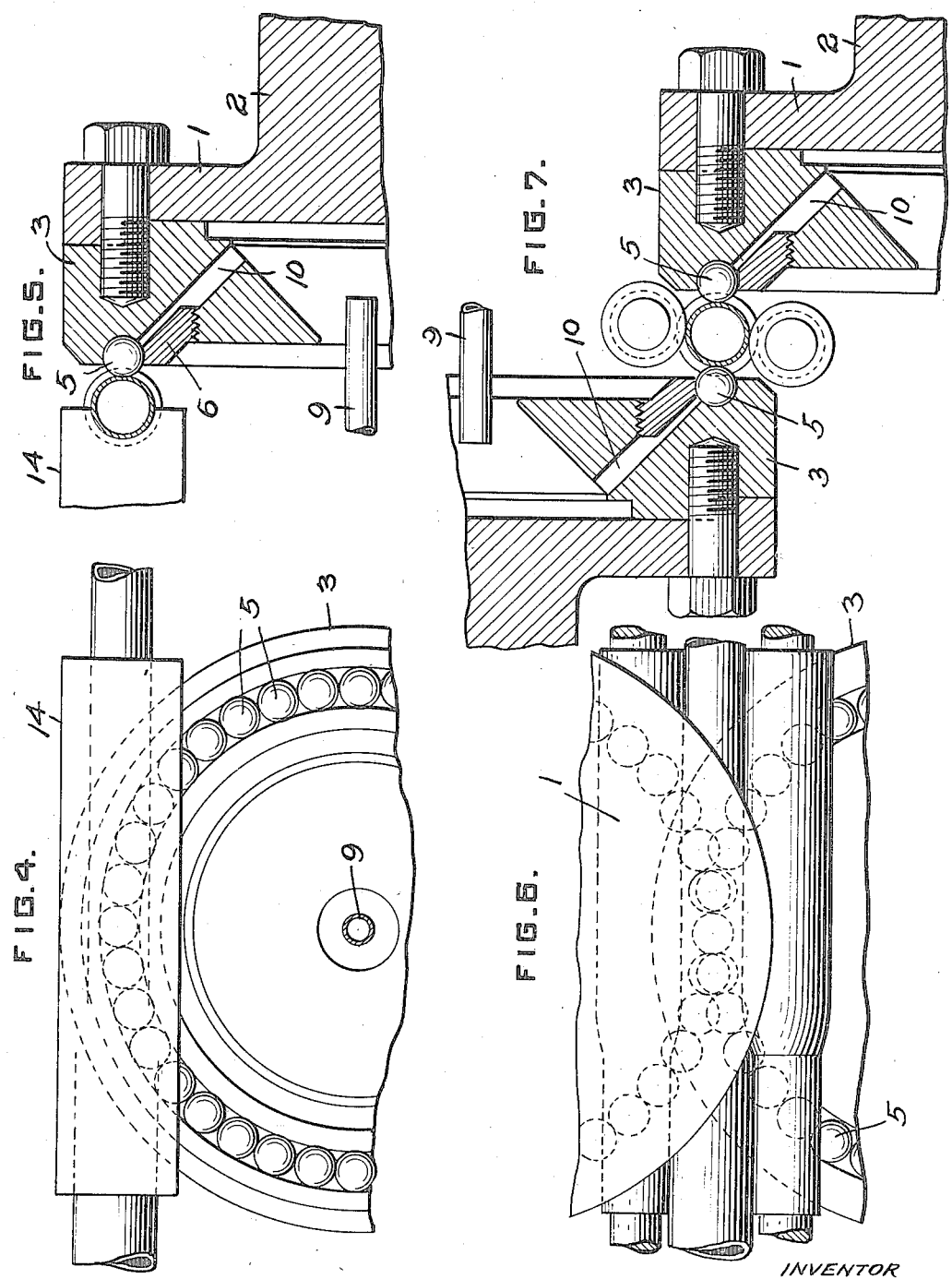

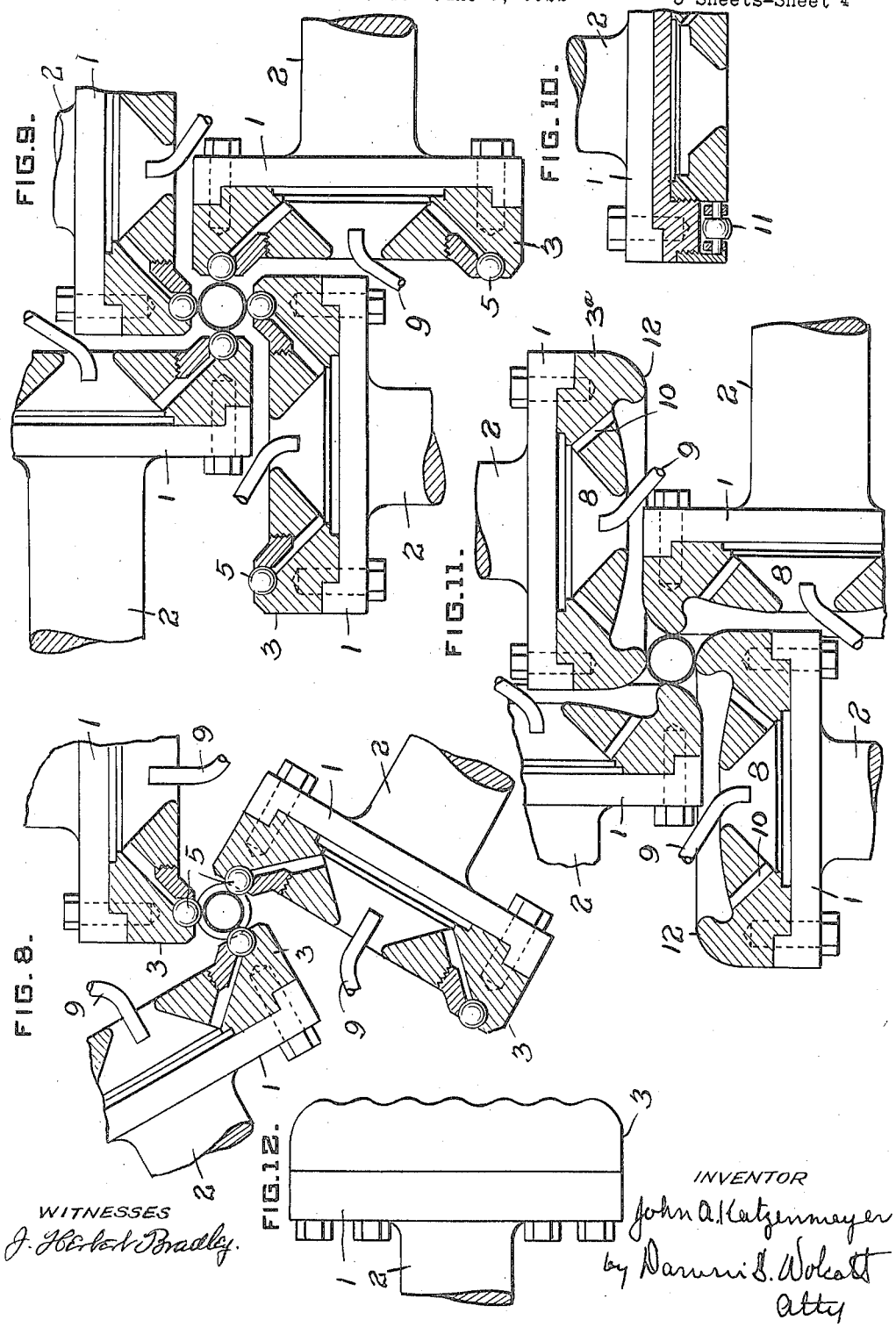

Patented July 1, 1924.

1,499,533

UNITED STATES PATENT OFFICE.

JOHN A. KATZENMEYER, OF ELLWOOD CITY, PENNSYLVANIA.

REDUCING CYLINDRICAL BODIES.

Application filed June 5, 1922. Serial No. 566,083.

*To all whom it may concern:*

Be it known that I, JOHN A. KATZENMEYER, residing at Ellwood City, in the county of Lawrence and State of Pennsylvania, a citizen of the United States, have invented or discovered certain new and useful Improvements in Reducing Cylindrical Bodies, of which improvements the following is a specification.

Two methods of rolling hollow billets or ingots to tubes are in general use, the methods being distinguished by the manner in which the reducing elements operate on the billet. In one method the reducing elements so operate on the billet as to cause a flow of metal longitudinally or parallel with the axis of the billet. In the practice of this method either oscillating swages or continuously operating rolls are employed. In the practice of the other method, the rolling elements cause the metal to flow spirally, and the rolling elements consist of rotating members, as rolls or discs, having their axes arranged at a comparatively acute angle to the axis of the billet.

The invention described herein has for its object effecting reduction of an article by means moving in an annular path, the plane of movement of such annular means being substantially parallel with the axis of the article, or in other words, the axis of such movement being at right angles to or approximately at right angles to the axis of the article, and so arranged with reference to the line of movement of the article that the reducing surface will move transversely and longitudinally of the article and the longitudinal component of such movement will be greater than the transverse component. The invention is hereinafter more fully described and claimed.

Figure 3:
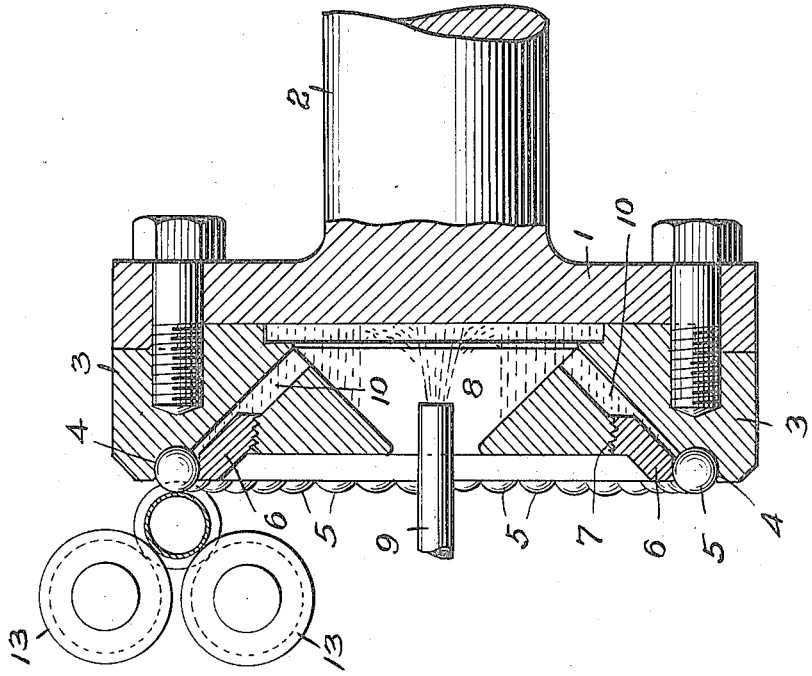
Figure 2:
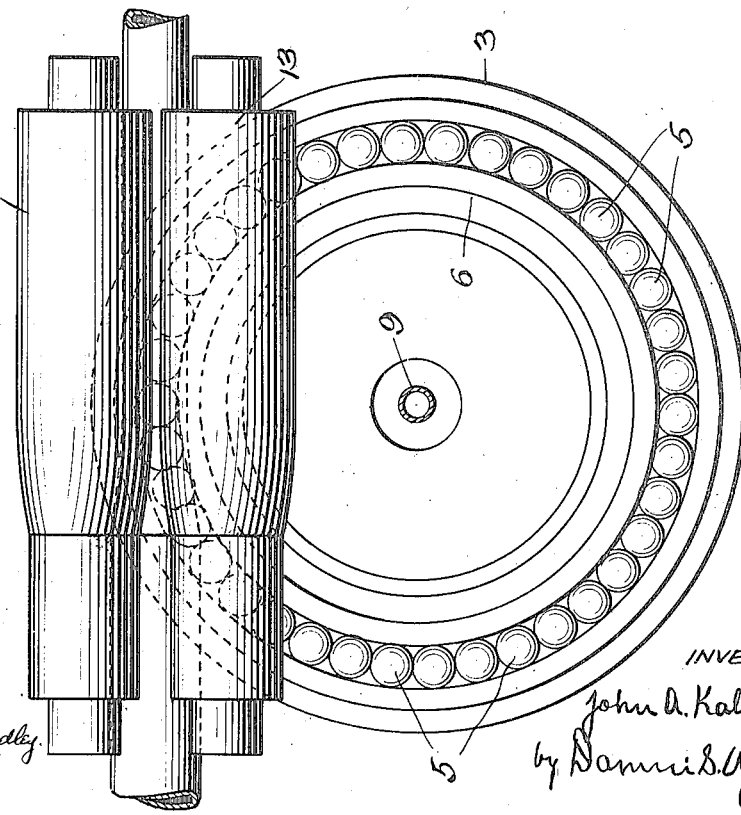
Figure 13:
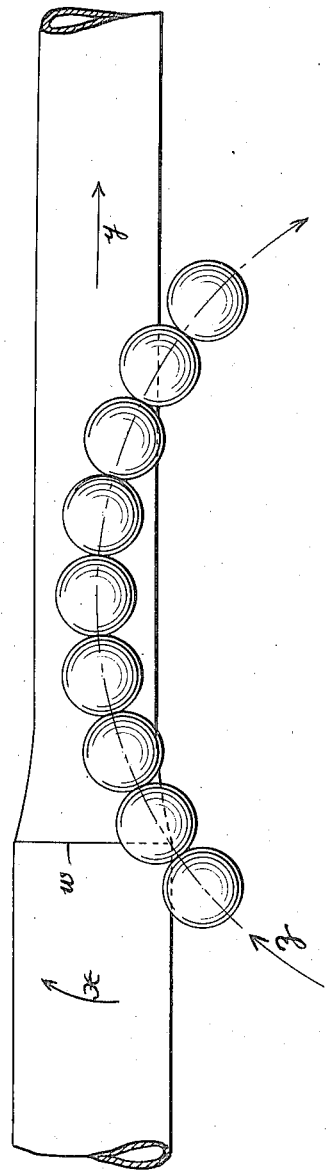
Figure 14:
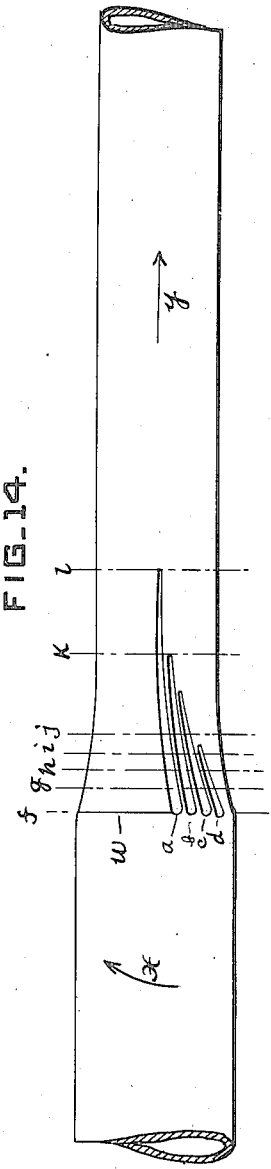

In the accompanying drawings forming a part of this specification, Fig. 1 is a plan view illustrating an embodiment of the improvement claimed herein; Fig. 2 is a side elevation; Fig. 3 is a sectional view showing an embodiment of the improvement employing one reducing head; Figs. 4 and 5 are views similar to Figs. 2 and 3 and illustrate a modification in the manner of supporting the article operated on; Figs. 6 and 7 are views similar to Figs. 2 and 3 illustrating a construction wherein two reducing heads are employed; Figs. 8 and 9 are sectional views illustrating the relative arrangement of reducing heads when three or four heads are employed; Figs. 10 and 11 are sectional views illustrating modifications in the constructions of the operative portions of the head; Fig. 12 is an elevation of the form of head shown in Fig. 11 illustrating a modification of the reducing ridge; Fig. 13 is a diagrammatic view showing the path of movement of the balls while acting on the article; Fig. 14 is a diagrammatic view illustrating the successive action of the balls on the article; and Fig. 15 includes views illustrating the vertical positions of a ball relative to the article while effecting reduction.

In the practice of the invention I employ one or more heads having the portions operative on the article preferably formed of freely rotating members, preferably hard metal balls, carried by the heads. Each head consists of a disc 1 formed on or secured to the end of a shaft 2 adapted to be driven in any suitable manner and an annulus 3 secured to the face of the disc. The outer face of the annulus is provided with a groove 4 circular in cross-section said groove forming the outer portion of a raceway for the reception of hard metal balls 5, which are retained in the raceway by a ring 6 screwing into a recess 7 extending inwardly from the groove 4. The inner wall of the annulus is undercut to form a cavity or recess 8 for the reception of a cooling and lubricating fluid which is supplied by a pipe 9 extending from any suitable source of supply. The fluid is forced from the cavity 8 through a plurality of passages 10 to the raceway by centrifugal action. It will be observed that the fluid will flow outward around and past the balls so that no scale or dirt can enter the raceway. As the heads will be rotated at a very high rate the fluid will exert a high pressure against the balls.

As shown in Fig. 10 loosely mounted rollers 11 may be employed in lieu of the balls, and in some cases it may be desirable to substitute a non-rolling or non-rotating surface in which case an annulus 3ª having a ridge 12 may be employed as shown in Figs. 11 and 12.

In the embodiment of the invention shown in Figs. 1, 6, and 7, two heads 1 are arranged on diametrically opposite sides of the line of movement of the article being operated on, so that one head will serve to hold the article in reducing or operative relation to the other head. In case only one head is employed, the article may be held in proper relation to the head by guide rollers 13 as shown in Figs. 2 and 3 or by a guide shoe 14 as shown in Figs. 4 and 5. Three or more heads may be employed, in which case they are arranged around the line of movement of the article as shown in Figs. 8 and 9, so that the balls of all the heads operate simultaneously on the same longitudinal section of the article. Preferably the heads are driven independently of each other by any suitable means, as for example, by motors 15, as shown in Fig. 1.

As the path of movement of the head is at an angle to the axis of the article, it will impart or tend to impart a rotary and longitudinal movement to the article, but as under some circumstances or conditions the desired effect may not result from movements so imparted, suitable means are employed for controlling the movements of the article. It will be understood that the terms "control", "controlling" or "controlled" are used herein to include the shifting of the article regardless of the movement of the head or as regulating or modifying any movements imparted to the article by the head. Suitable means for that purpose consist of discs 16 arranged at an angle to the line of movement of the article, and on opposite sides of the line. The shafts 17 of the discs are formed with pinions 18 thereon, intermeshing with pinions 19 on the shaft 20 which is driven by a suitable motor 21. The discs are movable towards and from each other by suitable means, as for example, a fluid pressure motor 22. It is also desirable to support the article on the delivery side of the heads, and to ensure control of the movements of the article after it has left the feeding discs and until it has passed from the reducing heads. Convenient means to effect these operations consist of a pair of rotating rolls 23 arranged with their axes at an angle one to the other. When operating on hollow ingots, billets, or tubes, and it is desired to reduce the internal diameter thereof, a mandrel 24 is employed as shown in Fig. 1. This mandrel is held in proper position by a bar 25, which extends back through a tubular head 26, so mounted in a thrust block 27 as to rotate freely. The bar 25 has secured thereon a disc 28 bearing against the end of the head.

In the embodiment of the improvement shown herein, the feeding mechanism or any other support for the article and the reducing head or heads are arranged in such relation that the axis of the tube will be parallel or approximately so to a line tangential to a circle or circles passing through the centers of the balls. Under such conditions or adjustments of the parts, the longitudinal components of the flow of metal effected by the balls will be greater than the transverse component.

In operating this mill, the head or heads are so adjusted with reference to a line which will be coincident with the axis of the article when in position to be fed in, that a plane tangential to all of the balls in a head will be substantially parallel with such line and distant therefrom a distance equal or approximately to the length of the radii of the article after being reduced. The heads having been adjusted, the article, as for instance a hollow billet or tube, is fed in between the heads by the discs 16 and also rotated at a rate determined by conditions hereinafter described. It will be understood that the grip of the feeding mechanism on the tube should be such as to maintain the desired rate of rotation and longitudinal movement of the article regardless of the rate of rotation of the head.

Figure 15:
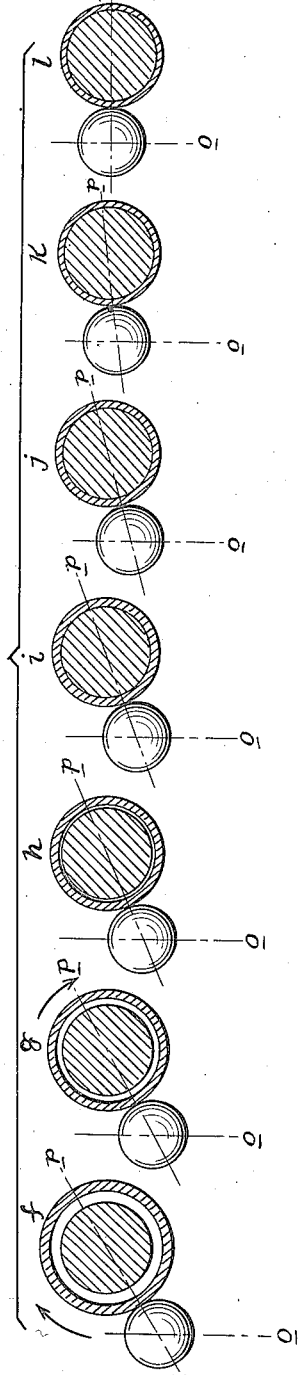

The action of the balls on the tube is clearly illustrated in Figs. 13 to 15, Fig. 13 showing the diagrammatically different positions of a ball transverse and longitudinal of the tube from the initial engagement therewith. The tube is being rotated in the direction of the arrow $x$ and moved longitudinally as indicated by the arrow $y$, and the head carrying the balls rotated as indicated by the arrow $z$. It will be observed that in the operation shown in Figs. 13, 14 and 15, the balls move in the same direction as the portions of the tube they are operating on, and hence the amount of reduction effected will be within certain limits proportional to the relative rates of movement of the balls and tube, as will be hereinafter more fully set forth. The paths of movement of the balls from their initial engagement with the tube is indicated by Fig. 13. It will be observed that the initial contact of a ball is at a point $a$ below a plane at right angles to the plane of rotation of the head and coincident with the axis of the article and a short distance in the rear of the line $w$ indicating where the reduction was started by a preceding ball. Fig. 14 is a view illustrating diagrammatically the sequence of operation of the balls and the paths of movement of the latter on the article; Fig. 15 includes views showing different transverse positions of a ball as it moves longitudinally. The succeeding balls will contact with the tube at points, $b$, $c$, $d$, etc., progressively further in the rear of and below the point $a$ as indicated in Fig. 14. Although for purposes of illustration, the paths of movement of the balls are shown spaced apart, in practice there will be no such separation, but the paths of the balls will overlap. If the longitudinal and rotary movements of the tube are slow relative to the peripheral rate of a head carrying a large number of balls, the line of maximum reduction by one ball will be separated a very small portion of an inch from the line of maximum reduction of the preceding ball. By properly proportioning the rate of rotation of the tube to that of the head, a practically smooth surface will be produced.

By reference to Figs. 13 and 14 it will be seen that by reason of the movement of the balls longitudinally of the tube the ball moves along portions of the tube decreasing in diameter, and as the longitudinal movement is very much more rapid than the movement of the balls transversely, the percentage of reduction longitudinally decreases. This travel of the balls along portions of the tube decreasing in diameter will be readily seen by reference to Figs. 14 and 15, the several views in Fig. 15 being sections on lines $f$, $g$, $h$, $i$, etc. of Fig. 14.

The percentage of reduction will of course be greatest where a ball strikes the tube and will progressively decrease as the ball moves along and around the tube until the center of the ball is coincident with or slightly below a plane coincident with the axis of the tube and at right angles to the plane of rotation of the head, at which point reduction ceases.

It will be readily understood by those skilled in the art that an increase of the internal diameter of the tube can be effected by changing the angle of the line of movement of the balls to the axis of the tube. This can be effected by adjusting the line of feed of the tube so that the balls will pass above the axis of the tube. In such case the heads should be arranged at a slight angle to the axis of the tubes, so that the balls, after having effected reduction and are moving down, will not rub against the finished portion of the tube. It is characteristic of the improvement described and claimed herein that reduction is effected by causing an annularly arranged reducing surface so transversely to the article to be reduced that the flow of metal will be spiral but with the longitudinal component greater than the transverse. In the preferred embodiment of the improvement the reduction of the article is effected by a plurality of balls carried or driven along an annular pathway.

It is characteristic of the method shown and described herein that as the plane of rotation of the head is substantially parallel with the axis of the article being reduced, and as the heads are so adjusted relative to the axis of the article that a plane tangential to the exposed surfaces of all the balls and heads will be substantially a distance from the axis an amount equal to the radii of the finished article, that such plane will be at an obtuse angle to radii passing through the point of initial contact of a ball with the article. This will be clearly seen by reference to the various views shown in Fig. 15 in which the line $o$ will indicate the plane of rotation of the head and the line P a radius passing through the several points of contact. It will be observed that as the ball is carried upward by the head by its point of initial contact that the angle made by the radii with the plane gradually diminishes and will become a right angle at the point where a ball ceases to effect reduction.

In cases where it is desired to reduce the external diameter of a tube the movements of the tube, both rotary and longitudinal, are made such that the amount of metal displaced by each ball will be small. It is believed that the balls will be carried along at a rate greater than the peripheral movement of the balls and hence the action of the balls on the article, the feed being small as above stated, will be closely analogous to a spinning operation although there will be some rolling action due to the rotation of the balls.

I claim herein as my invention:

1. The method of reducing a cylindrical body which consists in applying reducing pressure to the body in such manner as to cause the metal to flow spirally the longitudinal component of such flow being greater than the transverse component.

2. The method of reducing cylindrical bodies which consists in rotating said body and applying reducing pressure spirally, the initial point of such pressure being intermediate of the intersection of diametric lines at an angle of 45 degrees and the circumference of the body and terminating at a point substantially in a plane coincident with one of said diametric lines.

3. The method herein described of reducing cylindrical bodies which consists in rotating said body and subjecting said body to a plurality of spherical reducing elements moving transversely and longitudinally of the body, the rate of longitudinal movement being greater than that of the transverse movement.

4. A mechanism for reducing cylindrical bodies having in combination a rotating head provided with annular reducing portions, and means for supporting the body in such relation to the head that the reducing portion will move transversely and longitudinally of the body, the longitudinal movement being greater than the transverse.

5. A mechanism for reducing cylindrical bodies having in combination means for feeding the body longitudinally and a plurality of spherical reducing elements movable in an annular path, the axis of such movement being at substantially right angles to the line of movement of the body.

6. A mechanism for reducing a cylindrical body having in combination means for rotating and moving said body longitudinally, a head provided with an annular raceway, the axis of such raceway being substantially at right angles to the line of movement of the body, a plurality of balls movable along such raceway.

7. A mechanism for reducing a cylindrical body having in combination a rotatable head provided with an annular raceway, a plurality of balls arranged in the raceway and means for feeding the body to be reduced in a direction at substantially right angles to the axis of the annular raceway.

8. A mechanism for reducing a cylindrical body having in combination a rotatable head provided with an annular raceway and having a recess within the raceway and having passages connecting the recess with the raceway, and means for directing a fluid into the recess.

9. A mechanism for reducing a cylindrical body having in combination a rotatable head provided with an annular raceway, a plurality of balls arranged within the raceway, and mechanisms for controlling the movements of the body while being reduced, said mechanism being arranged on opposite sides of the head and adapted to support the body so that its axis will be substantially at right angles to the axis of rotation of the head.

10. The method herein described of reducing cylindrical bodies which consists in rotating and moving said body longitudinally and subjecting the same to the impact of a plurality of spherical elements moving in a plane whose angular relation to radii passing through points of contact of the reducing elements decreases as the elements move along said body.

In testimony whereof I have hereunto set my hand.

JOHN A. KATZENMEYER.